(12) United States Patent
Inou et al.

(10) Patent No.: US 7,853,390 B2
(45) Date of Patent: Dec. 14, 2010

(54) ACCELERATION CONTROL SYSTEM

(75) Inventors: Hiroshi Inou, Kariya (JP); Minoru Okada, Gifu (JP); Takehito Fujii, Anjo (JP); Seiji Totsuka, Tokai (JP)

(73) Assignee: Denso Corporation, Kariya (JP)

( * ) Notice: Subject to any disclaimer, the term of this patent is extended or adjusted under 35 U.S.C. 154(b) by 190 days.

(21) Appl. No.: 12/214,981

(22) Filed: Jun. 24, 2008

(65) Prior Publication Data

US 2008/0319628 A1    Dec. 25, 2008

(30) Foreign Application Priority Data

Jun. 25, 2007    (JP) ............................. 2007-166847

(51) Int. Cl.
*B60T 8/32*    (2006.01)

(52) U.S. Cl. ............................. 701/93; 701/96; 701/98; 182/107; 180/271; 180/374; 180/279

(58) Field of Classification Search .................. 701/93, 701/96, 98; 382/107; 180/271, 274, 279
See application file for complete search history.

(56) References Cited

U.S. PATENT DOCUMENTS

| | | | |
|---|---|---|---|
| 4,650,020 A | 3/1987 | Mizuno et al. | |
| 5,646,850 A | 7/1997 | Ishida et al. | |
| 5,901,806 A * | 5/1999 | Takahashi | ................. 180/170 |
| 6,434,472 B1 | 8/2002 | Minowa et al. | |
| 6,792,344 B2 | 9/2004 | Minowa et al. | |
| 6,856,874 B2 * | 2/2005 | Weilkes et al. | ................. 701/45 |
| 7,162,353 B2 | 1/2007 | Minowa et al. | |
| 7,308,961 B2 | 12/2007 | Satou et al. | |
| 7,337,046 B2 | 2/2008 | Minowa et al. | |
| 7,363,140 B2 * | 4/2008 | Ewerhart et al. | ............. 701/96 |
| 7,725,228 B2 | 5/2010 | Kobayashi et al. | |
| 2001/0014845 A1 | 8/2001 | Minowa et al. | |

(Continued)

FOREIGN PATENT DOCUMENTS

EP    1 445 452    8/2004

(Continued)

OTHER PUBLICATIONS

Extended Search Report dated Sep. 3, 2008 in European Application No. 080 09 721.5.

(Continued)

*Primary Examiner*—Jack Keith
*Assistant Examiner*—Rami Khatib
(74) *Attorney, Agent, or Firm*—Harness, Dickey & Pierce, PLC

(57) ABSTRACT

An acceleration control system stores a target acceleration calculation equation acquired by transforming an equation that expresses that a product of the differentiation of the square power of the speed and the environmental factor $\alpha_{env}$ represents a sensed value $\epsilon$ of acceleration. A surrounding environment monitor device detects surrounding bodies present in the forward periphery of the vehicle, and an environmental factor calculation unit calculates the environmental factor $\alpha_{env}$ by using the detected positions of the surrounding bodies. A target acceleration setting unit successively sets target accelerations $a_{ref}$ in compliance with the target acceleration calculation equation by using the environmental factor $\alpha_{env}$. The acceleration is executed to match the driver's feeling.

2 Claims, 5 Drawing Sheets

U.S. PATENT DOCUMENTS

| | | | |
|---|---|---|---|
| 2004/0006427 A1* | 1/2004 | Stiller | 701/300 |
| 2004/0040765 A1* | 3/2004 | Satou et al. | 180/170 |
| 2004/0153233 A1 | 8/2004 | Minowa et al. | |
| 2006/0195245 A1 | 8/2006 | Kobayashi et al. | |
| 2007/0106448 A1 | 5/2007 | Minowa et al. | |
| 2007/0198136 A1 | 8/2007 | Kobayashi et al. | |

FOREIGN PATENT DOCUMENTS

| | | |
|---|---|---|
| EP | 1 669 238 | 6/2006 |
| JP | 03-076247 | 4/1991 |
| JP | 05-058193 | 3/1993 |
| JP | 05-221254 | 8/1993 |
| JP | 06-255393 | 9/1994 |
| JP | 07-200999 | 8/1995 |
| JP | 10-166899 | 6/1998 |
| JP | 10-250409 | 9/1998 |
| JP | 2000-043611 | 2/2000 |
| JP | 2000-052809 | 2/2000 |
| JP | 2000-301965 | 10/2000 |
| JP | 2004-230912 | 8/2004 |
| WO | WO 2005/084992 | 9/2005 |
| WO | WO 2007/017476 | 2/2007 |

OTHER PUBLICATIONS

Office Action dated May 19, 2010 in Chinese Application No. 2008 1012 5783.0 with English translation thereof.

* cited by examiner

FIG. 3

$$\frac{d}{dt}\frac{1}{\tau^2} = \lim_{\Delta t \to 0} \frac{\frac{1}{\tau^2}\bigg|_{t=t_0+\Delta t, R=r} - \frac{1}{\tau^2}\bigg|_{t=t_0, R=r}}{\Delta t}$$

$$= \lim_{\Delta t \to 0} \frac{\frac{V^2_{t=t_0+\Delta t}\cos^2\phi}{r^2}(1+\tan^2\phi)^2 - \frac{V^2_{t=t_0}\cos^2\phi}{r^2}(1+\tan^2\phi)^2}{\Delta t}$$

$$= \lim_{\Delta t \to 0} \frac{V^2_{t=t_0+\Delta t} - V^2_{t=t_0}}{\Delta t} \cdot \frac{\cos^2\phi}{r^2}(1+\tan^2\phi)^2$$

$$= \frac{\cos^2\phi}{r^2}(1+\tan^2\phi)^2 \cdot \frac{dv^2}{dt}\bigg|_{t=t_0}$$

FIG. 4

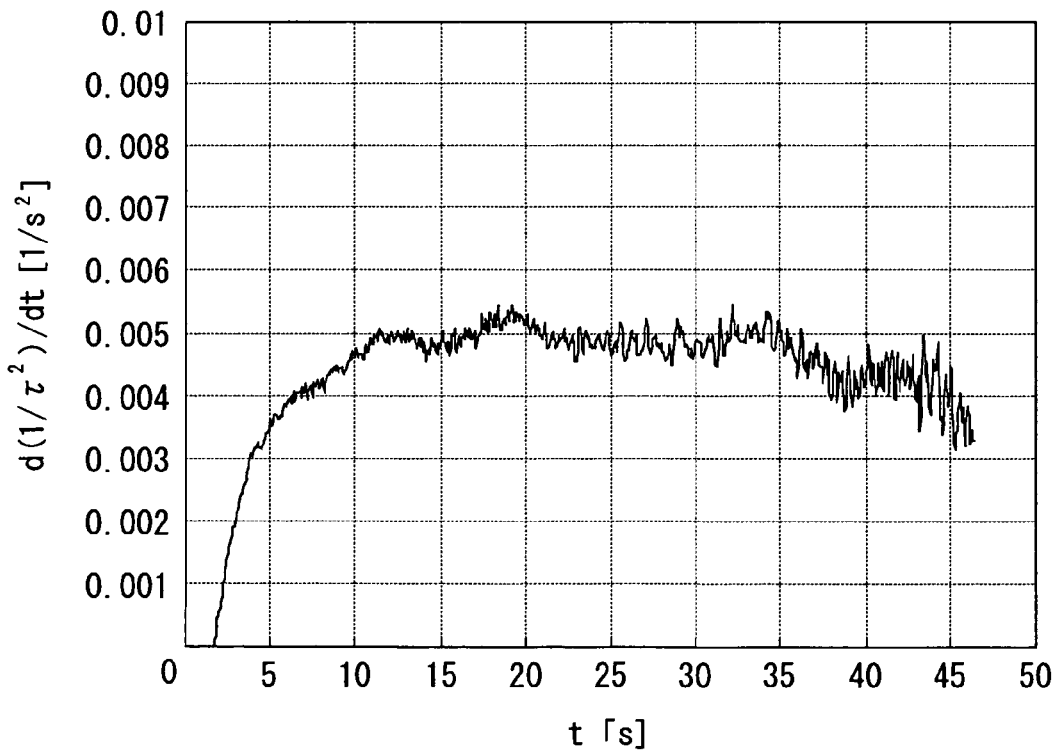

ACCELERATION CONTROL SYSTEM

CROSS REFERENCE TO RELATED APPLICATION

This application relates to and incorporates herein by reference Japanese Patent Application No. 2007-166847 filed on Jun. 25, 2007.

FIELD OF THE INVENTION

This invention relates to an acceleration control system for controlling acceleration of a vehicle and, particularly, to an acceleration control system capable of controlling the acceleration to match driver's feeling.

BACKGROUND OF THE INVENTION

In one conventional acceleration control system for a vehicle, when a target speed of vehicle travel is set, vehicle acceleration control is executed so as to automatically assume the target speed (for example, U.S. Pat. No. 4,650,020, JP 3-76247B). According to this system, immediately after the start of control, the target speed is set at a value higher than an actual vehicle speed by a predetermined value and, thereafter, the target speed is linearly increased. When the target speed is linearly increased as above, the acceleration becomes nearly constant.

When the vehicle is constantly accelerated up to the target speed, however, the driver often feels the controlled operation scary or finds the controlled acceleration offensive.

In another conventional acceleration control system for a vehicle, to realize acceleration that matches driver's acceleration feeling, an acceleration characteristic is selected depending upon the individual driver's ability and drive feeling, and the acceleration control is executed based on the selected acceleration characteristic (for example, JP 6-255393A).

When the acceleration is controlled by selecting an acceleration characteristic depending upon the individual driver's ability and drive feeling, the acceleration characteristic must be adjusted in advance to match the individual driver's ability and drive feeling. This adjusting operation is cumbersome and, besides, a number of acceleration characteristics must be provided.

SUMMARY OF THE INVENTION

This invention has an object of providing an acceleration control system capable of easily controlling acceleration to match driver's feeling.

According to a study, it was found that a visually recognized change in position of objects around a vehicle dominantly affects the acceleration feeling perceived by a driver. This acceleration feeling sensed by the driver was quantized by using the tau theory, which specifies the motion of an object body based on a change in the retinal image. As a result, it was found that if the acceleration feeling sensed by the driver changes, a differentiated value divided by a square power of visual information $\tau$ (hereinafter simply referred to as $\tau$) that represents the passing of time, too. Further it was found that the differentiated value divided by the square power of $\tau$ remains constant, if the acceleration feeling sensed by the driver is constant.

In order to achieve the above object, according to a first aspect, an acceleration control system successively detects positions of surrounding bodies present in the periphery of the vehicle but in front relative to the vehicle. The acceleration control system determines the target acceleration based upon the following (1) to (5), i.e., (1) the following Equation (Eq.) 1 expressing a relation among $\tau_S$ which represents, based on visual information, the time until a surrounding body in front of the vehicle comes in contact with the driver, an angular velocity u of the surrounding body with the driver as a reference, and $\tau$ which represents, based on visual information, the elapse of time until the surrounding body passes by the side of the vehicle, (2) the following Equation 2 between the differentiation of $1/\tau^2$ and a sensed value $\epsilon$ of acceleration numerically expressing the driver's acceleration feeling, (3) the following Equation 3 expressing a relation among $\tau_S$, a distance r from the vehicle to the surrounding body, and a differentiated value of the distance r, (4) a relative position of the surrounding body detected by the surrounding body detection device, and (5) a sensed value so of preset target acceleration used as the input value $\epsilon$ for the Equation 2.

$$\tau = \frac{\tau_s}{1 + u^2 \tau_s^2} \qquad \text{Eq. 1}$$

$$\frac{d}{dt}\frac{1}{\tau^2} = \varepsilon \qquad \text{Eq. 2}$$

$$\tau_s = -\frac{r}{\dot{r}} \qquad \text{Eq. 3}$$

If the acceleration feeling sensed by the driver changes, a differentiated value divided by the square power of $\tau$ varies. To give a desired acceleration feeling to the driver, therefore, the acceleration may be so controlled that the differentiated value divided by the square power of $\tau$ assumes a predetermined value. Therefore, the acceleration sensed by the driver is expressed by a numerical value $\epsilon$, and the Equation 2 of $\epsilon$ and the differentiated value divided by the square power of $\tau$ is used for determining the target acceleration. As expressed by the Equation 1, further, $\tau$ can be represented by $\tau_S$ and the angular velocity u of the surrounding body and as expressed by the Equation 3, $\tau_S$ can be expressed by the distance r up to the surrounding body and a differentiated value of the distance r (i.e., relative speed of the surrounding body). Therefore, the target acceleration is determined by using a position of the surrounding body relative to the vehicle, the above Equations 1 to 3 and the sensed value $\epsilon_0$ of target acceleration. The torque of a prime mover is controlled so as to assume the target acceleration and can realize the acceleration that matches the driver's feeling. Besides, the acceleration characteristic does not have to be adjusted in advance, and the acceleration can be easily controlled.

In addition to the above finding, it was also found through a geometrical calculation that the left side of the Equation 2, i.e., the differentiated value divided by the square power of $\tau$ is equal to a differentiated value of the square power of the speed multiplied by an environmental factor.

According to a second aspect, an acceleration control system detects the positions of surrounding bodies present in the periphery of the vehicle but in front on a polar coordinate system with the vehicle as a center and the line in the back-and-forth direction of the vehicle as an initial line. When a value based on visual information on a passing time (elapse of time) until the surrounding body present in front of the vehicle passes by the side of the vehicle is denoted by $\tau$, the acceleration control system determines an environmental factor that is a coefficient of the differentiated term of the square power of the speed based on the position of the surrounding body in the following Equation 4 between the differentiated value divided by the square power of τ and the differentiation of the square power of the speed. The acceleration control system stores the following Equation 5 between the right side of the Equation 4 and the sensed value ε of acceleration numerically expressing the driver's acceleration feeling or an equation transformed from the Equation 5 as a target acceleration calculation equation, and determines the target acceleration by substituting the environmental factor determined by the environmental factor calculation means, sensed value $\epsilon_0$ of a preset target acceleration and the current vehicle speed for the target acceleration calculation equation.

$$\frac{d}{dt}\frac{1}{\tau^2} = \frac{\cos^2\phi}{r^2}(1+\tan^2\phi)^2 \cdot \frac{dv^2}{dt} \qquad \text{Eq. 4}$$

where r is a distance from the vehicle to the surrounding body, φ is an angle of the surrounding body in the polar coordinate system, v is a speed of the surrounding body and t is a time, $$\alpha_{env} \cdot \frac{dv^2}{dt} = \varepsilon \qquad \text{Eq. 5}$$

where $$\alpha_{env} = \frac{\cos^2\phi}{r^2}(1+\tan^2\phi)^2$$

The right side of the Equation 4 is transformed from the left side through a geometrical calculation. The Equation 5 is acquired from the Equations 2, 4.

The sensed value $\epsilon_0$ of target acceleration is variously set to set a target acceleration depending upon the acceleration feeling sensed by the driver, and the torque of the prime mover is controlled based on the target acceleration. Therefore, the acceleration can be realized to match the driver's feeling. In the case of the second aspect, too, the acceleration characteristic does not have to be adjusted in advance, and the acceleration can be easily controlled.

BRIEF DESCRIPTION OF THE DRAWINGS

The above and other objects, features and advantages of the present invention will become more apparent from the following detailed description made with reference to the accompanying drawings. In the drawings:

FIG. 3 is a diagram showing Equations in the step of transforming a differentiated value divided by a square power of τ into a differentiation of a square power of speed;

FIG. 4 is a graph illustrating a relation between time of acceleration by a driver so that the intensity of acceleration feeling remains constant and a differentiated value of $1/\tau^2$;

DETAILED DESCRIPTION OF THE PREFERRED EMBODIMENT

Figure 1:
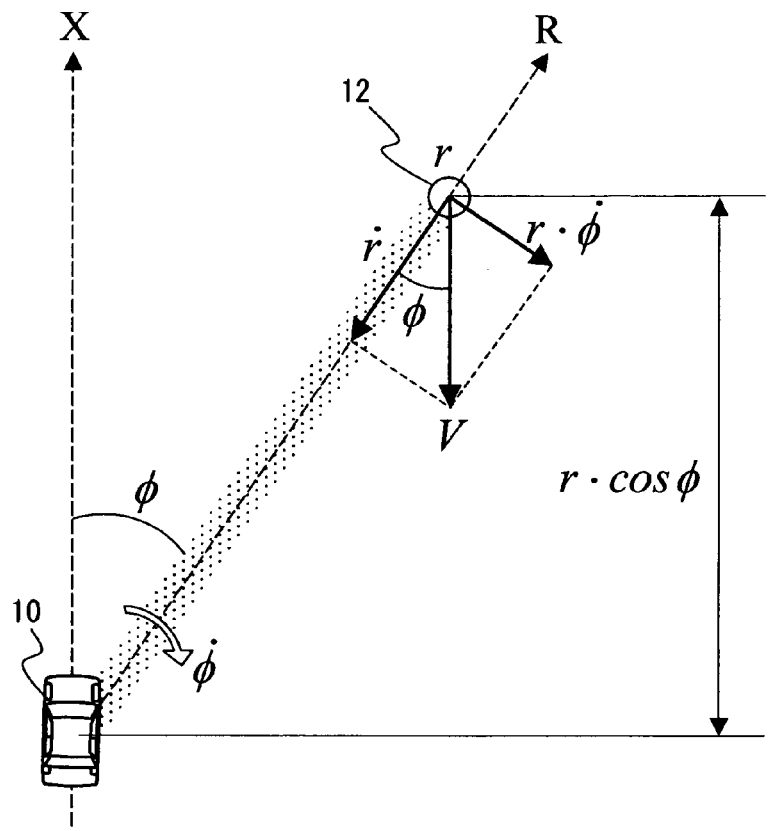
FIG. 1 is a diagrammatic view illustrating a body on a polar coordinate system with a vehicle as a center and a line in the back-and-forth direction of the vehicle as an initial line.

Referring first to FIG. 1, a vehicle 10 and a body 12 are illustrated as existing on a polar coordinate system (R, θ) with the vehicle 10 as a center and a line in the back-and-forth direction of the vehicle as an initial line (X-axis).

<Equations 1 and 3>

In the Equation 1, τ (tau) is a value that represents, based on visual information, the time until the body 12 passes by the side of the vehicle and is often referred to as τ of passage to distinguish it from $\tau_S$. The other $\tau_S$ is a value that represents, based on visual information, the time until the body 12 comes in contact with the driver who is driving the vehicle 10 and is often referred to as τ of contact to distinguish it from τ of passage. The visual information inclusive of both τ of passage and τ ($=\tau_S$) of contact stands for optical fluidity of the body 12 imaged on the retina.

The above Equation 3 expresses $\tau_S$ with an axis passing through the body 12 as an R-axis. Further, the above Equation 1 expressing τ of passage based on τ and the angular velocity u of the body 12 is a known relational expression that can be determined from a geometrical relation shown in FIG. 1.

Figure 2:
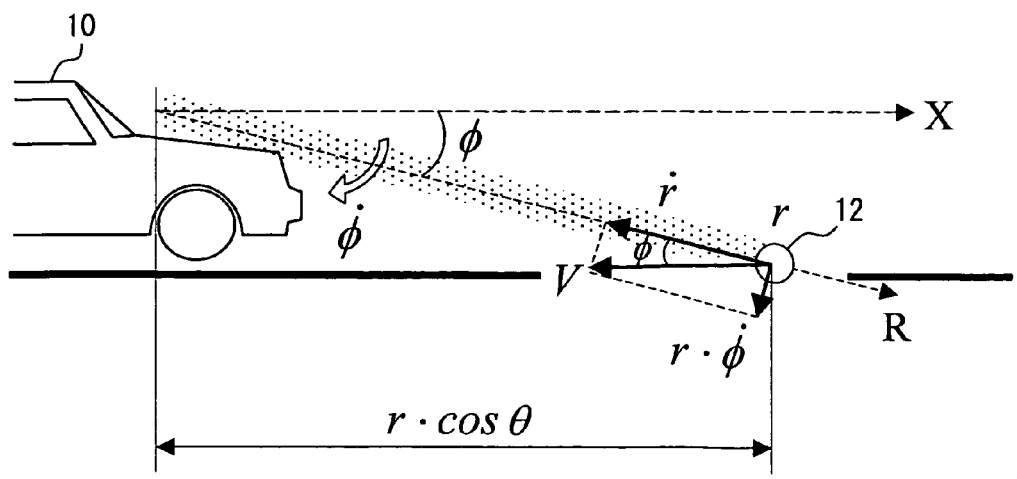
FIG. 2 is a diagrammatic view of the polar coordinate system as viewed from the side direction of a vehicle.

In FIG. 2, the vehicle 10 is shown in the polar coordinate system (R, θ) as viewed from the side direction. As will be understood from FIGS. 1 and 2, the R-axis which is a polar axis is an axis in a solid (three-dimensional) space.

<Equation 4>

From FIG. 1, $\tau_S$ and the angular velocity u can be expressed by the Equations 6 and 7 by using the distance r, velocity V and angle φ, $$\tau_s = -\frac{r}{\dot{r}} = -\frac{r}{V\cos\phi} \qquad \text{Eq. 6}$$

$$u = \dot{\phi} = \frac{V\sin\phi}{r} \qquad \text{Eq. 7}$$

By substituting the Equations 6 and 7 for the Equation 1, τ of passage can be expressed by the following Equation 8, $$\tau = \frac{\tau_s}{1+u^2\tau_s^2} \qquad \text{Eq. 8}$$

$$= \frac{-\frac{r}{V\cos\phi}}{1+\left(\frac{V\sin\phi}{r}\right)^2\left(\frac{r}{V\cos\phi}\right)^2}$$

$$= \frac{-1}{1+\tan^2\phi}\left(\frac{r}{V\cos\phi}\right)$$

Therefore, 1 divided by the square power of τ of passage is expressed by the Equation 9, $$\frac{1}{\tau^2} = -\frac{V^2\cos^2\phi}{r^2}(1+\tan^2\phi)^2 \qquad \text{Eq. 9}$$

If a differentiated value divided by the square power of τ of passage is calculated according to the Equation 9, transformations are successively acquired as defined in FIG. 3. As a result, the above Equation 4 is acquired, $$\frac{d}{dt}\frac{1}{\tau^2} = \frac{\cos^2\phi}{r^2}(1+\tan^2\phi)^2 \cdot \frac{dv^2}{dt} \qquad \text{Eq. 4}$$

In the Equation 4, the coefficient of the differentiated term of the square power of the speed ($dv^2/dt$) is an environmental factor $\alpha_{env}$. That is, the environmental factor $\alpha_{env}$ can be expressed by the Equation 10, and the differentiated value divided by the square power of τ expressed by the Equation 4 is a value that varies depending upon the environmental factor $\alpha_{env}$.

$$\alpha_{env} = \frac{\cos^2\phi}{r^2}(1+\tan^2\phi)^2 \qquad \text{Eq. 10}$$

<Equation 2>

A graph of FIG. 4 shows a relation between the time of when the driver has operated the accelerator by himself so that the intensity of acceleration feeling remains constant and $d(1/\tau^2)/dt$, that is, the differentiated value of $1/\tau^2$. In a state where the accelerator is operated so that the acceleration feeling remains constant as shown in FIG. 4, it will be learned that the rate of change of $1/\tau^2$ remains nearly constant except the rising period (e.g., 0 to 10 seconds) at the start of acceleration.

Figure 5:
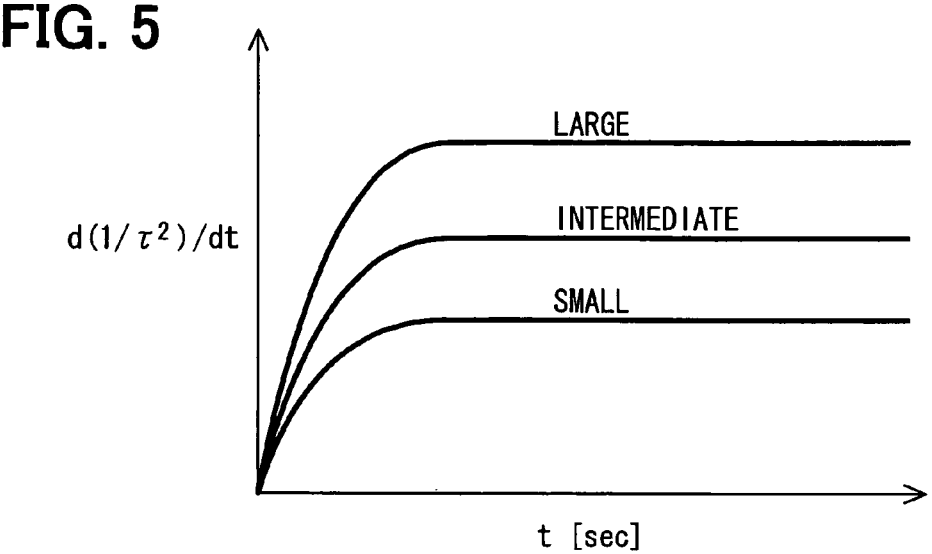
FIG. 5 is a graph schematically illustrating relations between time of driving that the acceleration feeling remains constant and a rate of change of $1/\tau^2$ in the cases of large, intermediate and small acceleration feelings.

As shown in FIG. 5, the rate of change of $1/\tau^2$, that is, the differentiated value of $1/\tau^2$ changes in accordance with large, intermediate and small acceleration feelings. The rate of change of $1/\tau^2$ however remains constant, if the acceleration feeling remains constant despite the acceleration feeling is different. It will be further learned that the rate of change of $1/\tau^2$ varies depending upon the magnitude of acceleration feeling.

Embodiment

Figure 6:
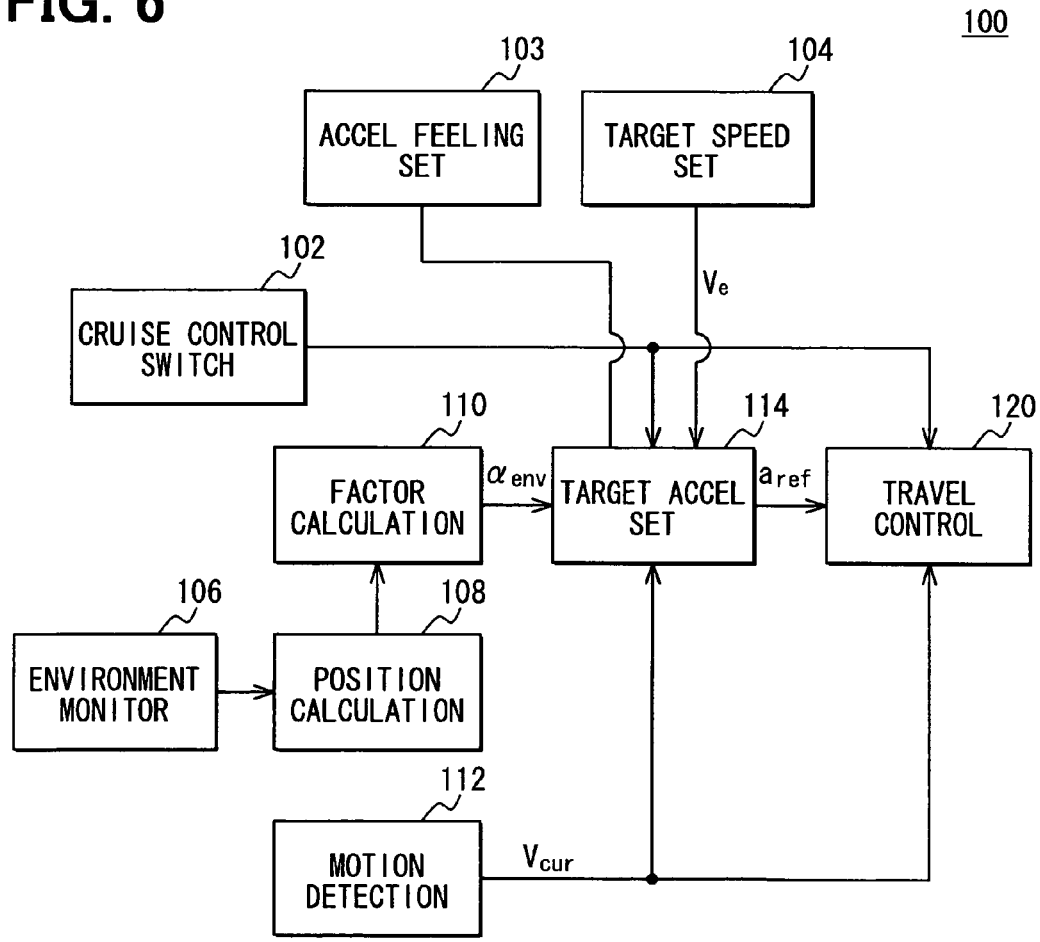
FIG. 6 is a block diagram illustrating an acceleration control system according to an embodiment of the invention.

Next, an embodiment of an acceleration control system will be described with reference to FIG. 6. In a control system 100, a cruise control switch 102 is operable by a driver to instruct the turn on/off of a cruise control. The cruise control is for automatically accelerating the vehicle up to a target speed, and after the target speed is reached, the target speed is maintained. When the control switch 102 is operated, a control signal is output to a target acceleration setting unit 114 and to a travel control unit 120 to instruct the turn on/off of the cruise control.

An acceleration feeling setting switch 103 is a switch for setting the magnitude of acceleration feeling desired by the driver, and any one of, for example, large, intermediate or small acceleration feeling can be set. A setpoint value of the acceleration feeling setting switch 103 is fed to a target acceleration setting unit 114. A target speed setting device 104 is operated by the driver for setting a target speed Ve, and feeds a signal representing the target speed Ve that is set to a target acceleration setting unit 114.

A surrounding environment monitor device 106 is a signal-acquiring device for acquiring signals of bodies present in the vicinity of the vehicle 10 but in front, and successively acquires the signals at regular intervals. Though the embodiment uses a camera, a radar such as a millimeter wave radar may be also used. The range in which the signals are acquired by the surrounding environment monitor device 106 may include part of a region in front of the vehicle and is, desirably, nearly equal to the visual field of the driver.

A polar coordinate system position calculation unit 108 analyzes the signals acquired by the surrounding environment monitor device 106 and operates the positions of the surrounding bodies present in the periphery of the vehicle 10 and in front. The calculated positions are on the polar coordinate system (R, θ) with the vehicle 10 as a center and the line in the back-and-forth direction of the vehicle as an initial line.

The polar coordinate system position calculation unit 108 operates the positions of solid bodies present on a road and in the vicinity thereof. In this embodiment, further, positions of planar bodies, too, are operated. Planar bodies include, for example, part or whole of a road sign drawn on the surface of the road. Further, part of the texture of the road surface or the whole of the texture may be regarded as the body.

Which bodies should be operated for their positions can be variously set. In this embodiment, however, a plurality of portions in the signal-acquiring range (i.e., imaging range) are set in advance as position calculation regions, and positions of the bodies present on a plurality of position calculation regions are calculated. Further, the plurality of position calculation regions are so set as to be uniformly dispersed in the visual field of the driver.

An environmental factor calculation unit 110 successively calculates environmental factors $\alpha_{env}$ expressed by the Equation 10 and outputs the calculated environmental factors $\alpha_{env}$ to the target acceleration setting unit 114. However, the environmental factors $\alpha_n$ (n is the number of the position calculation regions, i.e., the number of the bodies to be detected) are calculated from the Equation 10 for a plurality of bodies 12 of which the positions are calculated by the polar coordinate system position calculation unit 108. An average value of the environmental factors $\alpha_n$, i.e., the following Equation 11 is used as an environmental factor $\alpha_{env}$ to be output to the target acceleration setting unit 114, $$\alpha_{env} = \frac{\sum \alpha_n(r,\theta)}{N} \qquad \text{Eq. 11}$$

Figure 7:
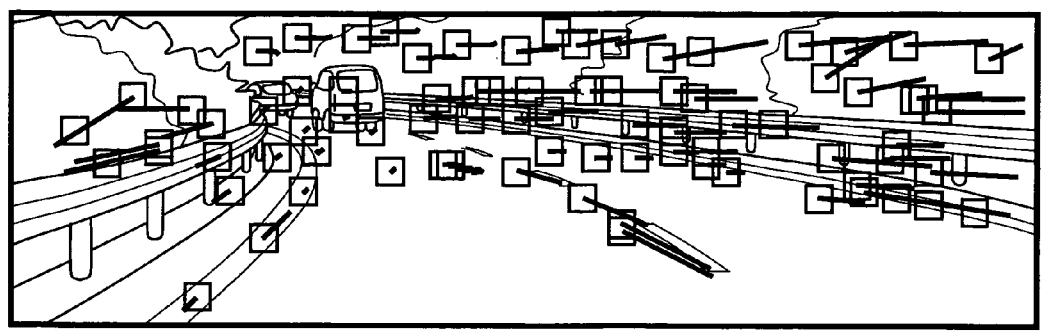
FIG. 7 is a view illustrating results of calculating the magnitudes of differentiated values of $1/\tau^2$ for various regions in front of the vehicle.

Described below is why the average value of the environmental factors $\alpha_n$ is used as the environmental factor $\alpha_{env}$. FIG. 7 is a view illustrating the results of calculating the magnitudes of differentiated values of $1/\tau^2$ for various regions in front of the vehicle. In FIG. 7, square frames represent the positions where the differentiated values of $1/\tau^2$ are calculated. Segments extending from the square frames in a bar shape represent, by lengths, the magnitudes of the differentiated values of $1/\tau^2$ calculated at the calculation positions. As will be understood from FIG. 7, the differentiated values of $1/\tau^2$ are small in the regions in front of the vehicle but the differentiated values of $1/\tau^2$ increase toward the periphery. It is, on the other hand, considered that the driver is perceiving the acceleration feeling from the entire flow of the visual field. In this embodiment, therefore, the average value of the environmental factors $\alpha_n$ is used as the environmental factor $\alpha_{env}$.

A vehicle motion detection device 112 is the device for detecting the current speed $V_{cur}$ of the vehicle 10, and operates to successively detect the positions by using a wheel speed sensor or a GPS in order to detect the vehicle speed from a change in the position with the passage of time. The current vehicle speed $V_{cur}$ detected by the vehicle motion detection device 112 is output to the target acceleration setting unit 114 and to the travel control unit 120.

The target acceleration setting unit 114 stores the following Equation 12 as a target acceleration calculation equation, and sets a target acceleration $a_{ref}$ from when a control signal (control start signal) for instructing the turn on of cruise control is fed from the control switch 102 until a control signal (control stop signal) for instructing the turn off of cruise control is fed.

First, the target accelerations $a_{ref}$ are successively determined by using the Equation 12 until the current speed $V_{cur}$ becomes equal to the target speed Ve set by the target speed setting device 104. After the current speed $V_{cur}$ has become equal to the target speed Ve, the target accelerations $a_{ref}$ are successively determined for executing the constant speed control (for instance PID control).

$$a_{ref} = \frac{\varepsilon_0}{2\alpha_{env} \cdot v_{cur}} \qquad \text{Eq. 12}$$

The following Equation 5 is acquired from the Equations 2 and 4. The Equation 5 is expanded to acquire the Equation 13. V dot (v̇) in the Equation 13 represents acceleration. By transforming the Equation 13 into an equation of v dot, the Equation 12 is acquired.

$$\alpha_{env} \cdot \frac{dv^2}{dt} = \varepsilon \qquad \text{Eq. 5}$$

where $$\alpha_{env} = \frac{\cos^2\phi}{r^2}(1 + \tan^2\phi)^2$$

$$2\alpha_{env} \cdot v \cdot \dot{v} = \varepsilon \qquad \text{Eq. 13}$$

To determine the target acceleration $a_{ref}$, a sensed value $\varepsilon_0$ of target acceleration is determined to be a value that corresponds to a signal from the acceleration feeling setting switch 103 by using an acceleration feeling value setting map that has been stored in advance. The determined sensed value $\varepsilon_0$ of target acceleration, the environmental factor $\alpha_{env}$ fed from the environmental factor calculation unit 110 and the current speed $V_{cur}$ fed from the vehicle motion detection device 112 are substituted for the Equation 12 to determine the target acceleration $a_{ref}$.

The travel control unit 120 operates a torque instruction value according to a target acceleration $a_{ref}$ formed by the target acceleration setting unit 114 from when a control signal (control start signal) for instructing the turn on of cruise control is fed from the control switch 102 until when a control signal (control stop signal) for instructing the turn off of cruise control is fed. Thereafter, the torque of the prime mover (engine or motor) is controlled based on the operated torque instruction value.

Figure 8:
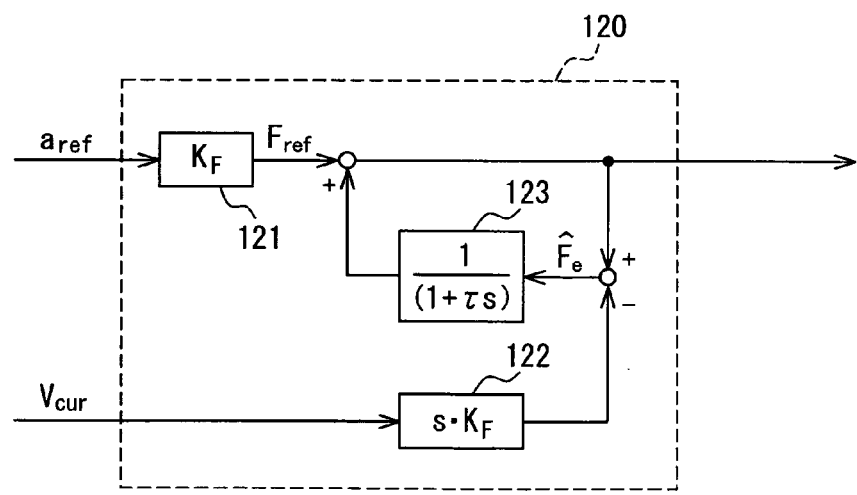
FIG. 8 is a block diagram illustrating a travel control unit used in the embodiment shown in FIG. 6.

The travel control unit 120 is shown in FIG. 8 in a functional block diagram. The target acceleration $a_{ref}$ is input to a multiplier 121 where it is multiplied by a gain $K_F$ to calculate a target power $F_{ref}$. The gain $K_F$ is a value set in advance by taking the weight of vehicle and the like into consideration. An actual power calculation unit 122 calculates the actual power of the vehicle 10 by using the current speed $V_{cur}$ and a transfer function $s \cdot K_F$. A difference between the target power $F_{ref}$ and the actual power is calculated as an estimated disturbance. After high-frequency components are removed by a low-pass filter 123, the estimated disturbance calculated above is added to the target power $F_{ref}$. The value after added is output as a torque instruction value.

Figure 9:
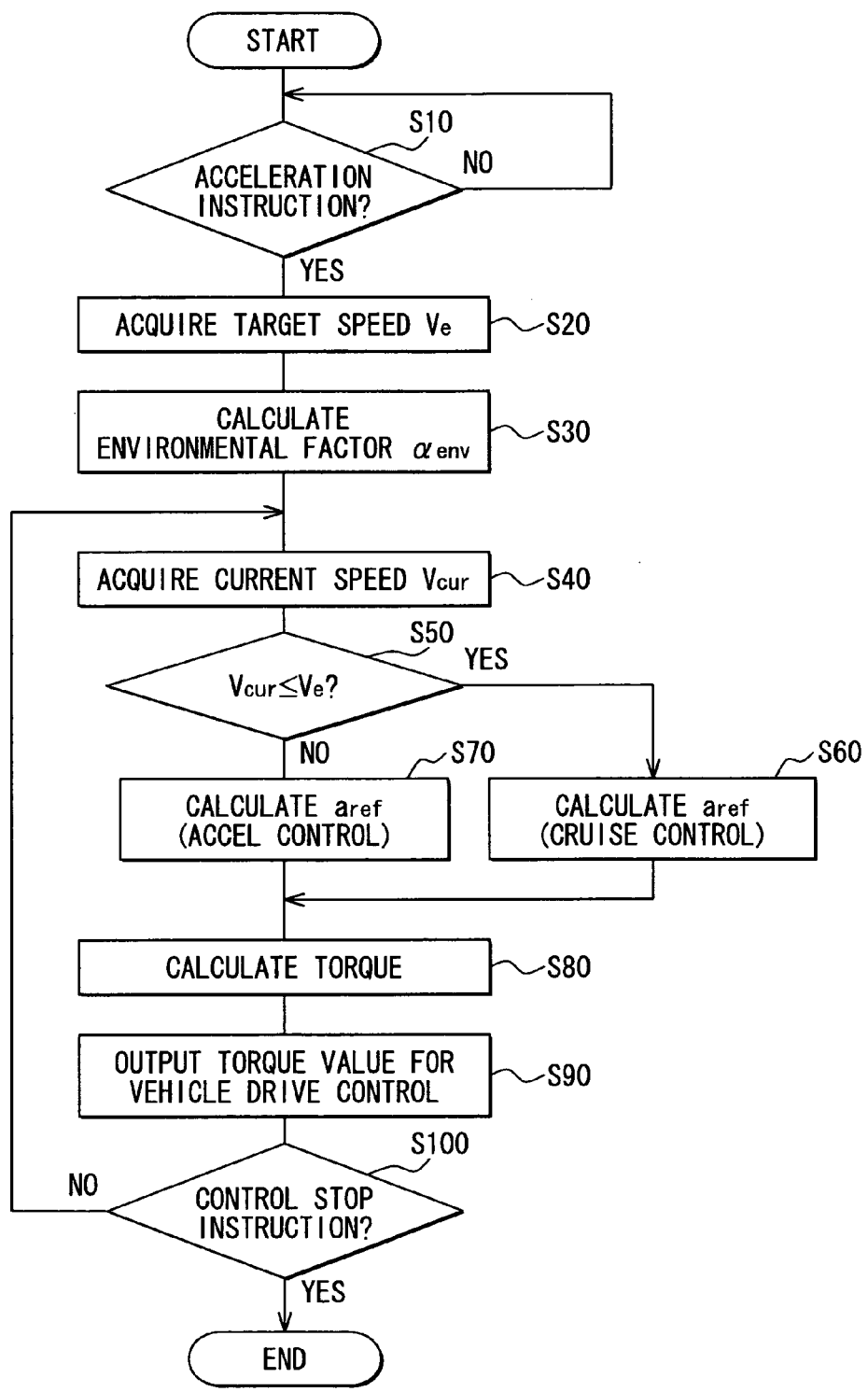
FIG. 9 is a flowchart illustrating major portions of control executed in the embodiment shown in FIG. 6.

Next, major portions of control in the acceleration control system 100 will be described by using a flowchart shown in FIG. 9. In FIG. 9, S30 is processing in the environmental factor calculation unit 110, S80 and S90 are processing in the travel control unit 120, and other S are processing in the target acceleration setting unit 114.

At S10, first, it is checked by a control signal if an acceleration instruction is received. If a control start signal is fed, the cruise control is turned on to execute the acceleration until the target speed Ve is attained. It is therefore determined that an acceleration instruction is received if the control start signal is fed from the control switch 102 to the target acceleration setting unit 114. If it is determined that the acceleration instruction is received (YES), the routine proceeds to S20. If it is determined that the no acceleration instruction is received (NO), the checking at S10 is repeated.

At S20, the target speed Ve is acquired from the target speed setting device 104. Next S30 is processing by the environmental factor calculation unit 110 as described above and by which the environmental factor $\alpha_{env}$ expressed by the Equation 11 is calculated from the positions of the plurality of bodies 12 operated by the polar coordinate system position calculation unit 108.

At next S40, the current speed $V_{cur}$ is acquired from the vehicle motion detection device 112. At S50, it is checked whether the current speed $V_{cur}$ acquired at S40 is smaller than the target speed Ve acquired at S20. If the determination is affirmative (YES), the routine proceeds to S60 where the target acceleration $a_{ref}$ is calculated for constant speed control (cruise control). The constant speed control is a PID control which calculates the target acceleration $a_{ref}$ according to the following Equation 14 wherein $K_P$, $K_D$ and $K_I$ are preset gains, $$a_{ref} = \left(K_P + sK_D + \frac{K_I}{s}\right) \cdot (V_e - V_{cur}) \qquad \text{Eq. 14}$$

If the determination at S50 is negative (NO), on the other hand, the routine proceeds to S70 where the target acceleration $a_{ref}$ is calculated for acceleration control. That is, the sensed value $\varepsilon_0$ of target acceleration is determined to be a value that corresponds to a signal from the acceleration feeling setting switch 103. The thus decided sensed value $\varepsilon_0$ of target acceleration, the environmental factor $\alpha_{env}$ calculated at S30 and the current speed $V_{cur}$ acquired at S40 are substituted for the above Equation 12 to thereby calculate the target acceleration $a_{ref}$.

After having executed S60 or S70, S80 is executed. S80 is processing in the travel control unit 120 which calculates the target power $F_{ref}$ from the target acceleration $a_{ref}$ as described above, calculates the actual power from the current speed $V_{cur}$, regards a difference therebetween as an estimated disturbance, and calculates a torque instruction value by adding the estimated disturbance thereto. At S90, the torque instruction value calculated at S80 is output to the prime mover of the vehicle for a travel control.

At S100, it is checked whether a control stop instruction is issued, i.e., if a control stop signal is fed from the control switch 102 to the target acceleration setting unit 114. If the determination is negative (NO), the routine returns back to S40 above. In this case, therefore, the current speed $V_{cur}$ is acquired again, and the target acceleration $a_{ref}$ is calculated again by using the current speed $V_{cur}$ that is acquired again. If the determination at S100 is affirmative (YES), the routine ends. In this case, the cruise control ends.

As described above, the acceleration control system 100 stores the target acceleration calculation equation (Equation 12) acquired by transforming the Equation 5 which expresses that a product of the differentiation of the square power of the speed and the environmental factor $\alpha_{env}$ becomes the sensed value $\epsilon$ of acceleration. The surrounding bodies 12 present in the periphery of the vehicle but in front are actually detected, the environmental factor $\alpha_{env}$ is calculated from the detected positions of the surrounding bodies 12, and the target accelerations $a_{ref}$ are successively formed in compliance with the target acceleration calculation equation (Equation 12) by using the calculated environmental factor $\alpha_{env}$. Therefore, the acceleration can be controlled to match the driver's feeling. Besides, the acceleration characteristic does not have to be adjusted in advance, and the acceleration can be easily controlled.

Further, the acceleration control system 100 detects the positions of a plurality of surrounding bodies 12 and determines the environmental factors $\alpha_{env}$ based on the positions of the plurality of surrounding bodies 12. Therefore, the acceleration can be controlled to further match the driver's feeling.

It should be noted that the invention is not limited to the above embodiment only and many modifications may be implemented.

For example, the environmental factor $\alpha_{env}$ may be repetitively calculated at regular intervals during the acceleration control of the cruise control, and the target acceleration $a_{ref}$ may be calculated by using the latest environmental factor $\alpha_{env}$.

Further, when it is determined that the acceleration instruction is issued, the acceleration control system 100 readily executes the acceleration control by using the target acceleration $a_{ref}$ calculated by using the Equation 12. In the initial stage of acceleration, however, the acceleration may be controlled by using another target acceleration (e.g., a constant acceleration) instead of controlling the acceleration by using the target acceleration $a_{ref}$. In this case, the acceleration control by the target acceleration $a_{ref}$ is executed after, for example, a predetermined period of time has passed from the start of acceleration.

Further, though the acceleration control system 100 of the above embodiment has calculated the environmental factor $\alpha_{env}$ from the positions of the plurality of surrounding bodies 12, it is also allowable to calculate the environmental factor $\alpha_{env}$ from the position of one surrounding body 12.

The acceleration control system 100 executes the acceleration control while maintaining the sensed value $\epsilon_0$ of target acceleration constant. However, the sensed value $\epsilon_0$ of target acceleration may be varied during the acceleration. For example, if the sensed value $\epsilon_0$ of target acceleration is further increased in the latter half of acceleration, then the driver can feel the acceleration that boosts in the latter half. Thus, upon varying the sensed value $\epsilon_0$ of target acceleration during the acceleration, the driver can feel various kinds of acceleration that he likes.

What is claimed is:

1. An acceleration control system for setting a target speed and performing acceleration control of a vehicle based on the target speed and a current speed, the acceleration control system comprising:

a surrounding body detection device for successively detecting relative positions of surrounding bodies present in a front outside periphery of the vehicle;

means for calculating, based upon the following Equations 1 to 3, a target acceleration from the relative position of the surrounding body detected by the surrounding body detection device and a preset target acceleration sensed value $\epsilon_0$ which is used as a sensed value $\epsilon$ of acceleration defined by the Equation 2, wherein the Equation 1 expresses a relation among $\tau_s$ which represents, based on visual information, time until a surrounding body in front of the vehicle comes in contact with a driver, an angular velocity u of the surrounding body relative to the driver as a reference, and $\tau$ which represents, based on visual information, an elapse of time until the surrounding body passes by a side of the vehicle, wherein the Equation 2 expresses a relation between differentiation of $1/\tau^2$ and the sensed value $\epsilon$ of acceleration which numerically expresses a driver's acceleration feeling, and the Equation 3 expresses a relation among $\tau_s$, distance r from the vehicle to the surrounding body and a differentiated of the distance r; and means for controlling torque of a prime mover of the vehicle so as to attain the target acceleration determined by the calculating means, $$\tau = \frac{\tau_s}{1 + u^2 \tau_s^2} \qquad \text{(Equation 1)}$$

$$\frac{d}{dt}\frac{1}{\tau^2} = \varepsilon \qquad \text{(Equation 2)}$$

$$\tau_s = -\frac{r}{\dot{r}}. \qquad \text{(Equation 3)}$$

2. The acceleration control system according to claim 1, wherein the calculating means successively determines target accelerations while maintaining constant the target acceleration sensed value $\epsilon_0$.

* * * * *